United States Patent
Lin et al.

(10) Patent No.: US 8,139,174 B2
(45) Date of Patent: Mar. 20, 2012

(54) DISPLAY DEVICE FOR DISPLAYING IMAGES INVOLVING DISPLAY PIXELS AND NON-DISPLAY PIXELS

(75) Inventors: Ching-Wei Lin, Taoyuan (TW); Jing-Chen Huang, Tainan (TW)

(73) Assignee: Chimei Innolux Corporation, Miao-Li County (TW)

(*) Notice: Subject to any disclaimer, the term of this patent is extended or adjusted under 35 U.S.C. 154(b) by 1381 days.

(21) Appl. No.: 11/329,308

(22) Filed: Jan. 10, 2006

(65) Prior Publication Data
US 2007/0159567 A1    Jul. 12, 2007

(51) Int. Cl.
*G02F 1/136* (2006.01)
(52) U.S. Cl. .......................................................... 349/43
(58) Field of Classification Search ............... 349/43–48
See application file for complete search history.

(56) References Cited

U.S. PATENT DOCUMENTS

| | | | |
|---|---|---|---|
| 5,784,132 A * | 7/1998 | Hashimoto | 349/44 |
| 5,978,255 A * | 11/1999 | Naritake | 365/149 |
| 6,738,204 B1 | 5/2004 | Chuang et al. | 359/891 |
| 6,773,467 B2 | 8/2004 | Shih | 29/25.03 |
| 6,791,631 B2 | 9/2004 | Cheng et al. | 349/39 |
| 6,816,210 B2 | 11/2004 | Chen | 349/44 |
| 6,864,937 B2 | 3/2005 | Moon et al. | |
| 6,930,372 B2 | 8/2005 | Chiu et al. | 257/532 |
| 2002/0044246 A1* | 4/2002 | Moon et al. | 349/141 |
| 2003/0210359 A1* | 11/2003 | Lee et al. | 349/43 |
| 2006/0146242 A1* | 7/2006 | Kim et al. | 349/129 |
| 2006/0176266 A1* | 8/2006 | Pak et al. | 345/104 |

FOREIGN PATENT DOCUMENTS

| | | |
|---|---|---|
| JP | 63-010558 | 1/1988 |
| JP | 07-333654 | 12/1995 |
| JP | 08-146460 | 6/1996 |
| JP | 08-179358 | 7/1996 |
| JP | 2000147556 A | 5/2000 |
| JP | 2001-021912 | 1/2001 |
| JP | 2002-110995 | 4/2002 |
| TW | I242286 | 10/2005 |

OTHER PUBLICATIONS

English language translation of abstract of JP 07-333654.
English language translation of abstract of JP 63-010558.
English language translation of abstract of JP 002-110995.
English language translation of abstract of JP 08-179358.
English language translation of abstract of JP 2001-021912.
English language translation of abstract of JP 08-146460.
Chinese language office action.
Taiwanese language office action dated Oct. 27, 2010.
English language translation of abstract of TW I242286 (published Oct. 21, 2005).

* cited by examiner

*Primary Examiner* — Mark Robinson
*Assistant Examiner* — Jerry Blevins
(74) *Attorney, Agent, or Firm* — Thomas|Kayden (57) ABSTRACT

Display devices for displaying images are provided. A representative display device incorporates a display panel that includes a display pixel and a non-display pixel. The display pixel includes at least one switching thin-film transistor and the non-display pixel includes dummy thin-film transistors. A number of the dummy thin-film transistors exceeds a number of the switching thin-film transistors.

13 Claims, 8 Drawing Sheets

DISPLAY DEVICE FOR DISPLAYING IMAGES INVOLVING DISPLAY PIXELS AND NON-DISPLAY PIXELS

BACKGROUND

Figure 1:
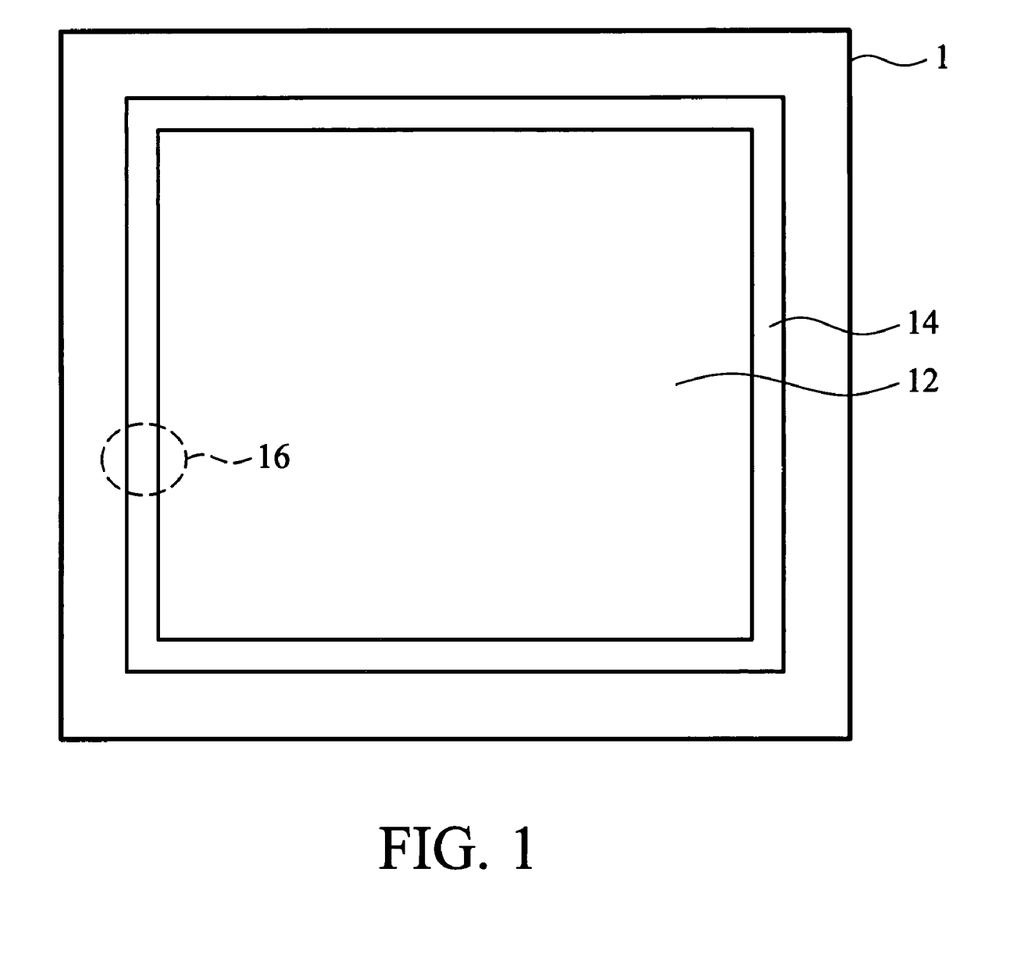
FIG. 1 is a schematic diagram of a display panel.

The disclosure relates to image display technologies. FIG. 1 is a schematic diagram of a display panel. The display panel 1 is formed by a deposition step, several photolithography steps, and several etching steps, among others. In any of the aforementioned processing steps, electrostatic charge may accumulate in the display panel. Since electrostatic charge tends to accumulate at the ends of a long metal line, a non-display area 14 is usually required around a display area 12 for reducing the potential of electrostatic discharging damage.

Figure 2:
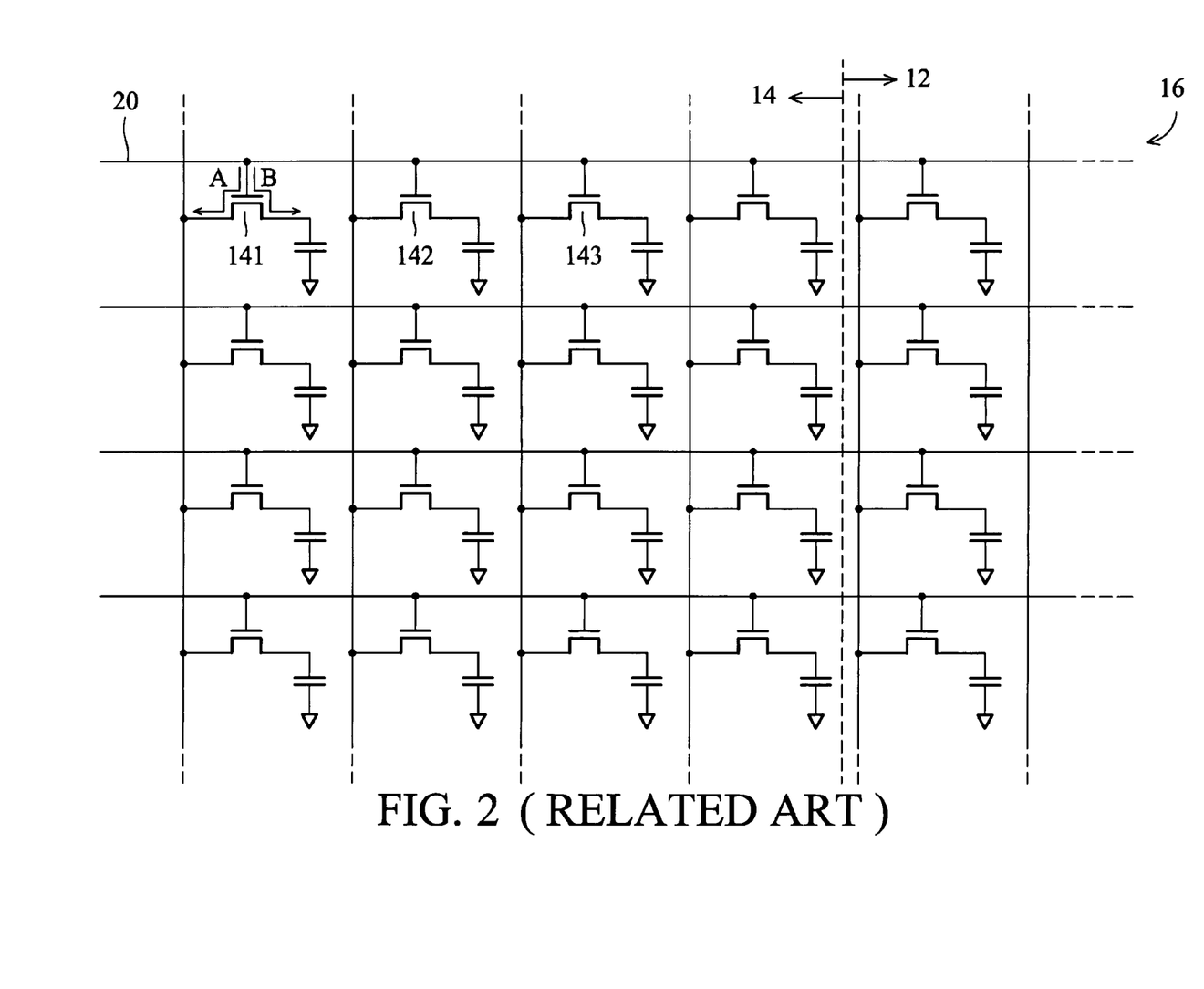
FIG. 2 is a schematic diagram of a portion of the display panel of FIG. 1.

FIG. 2 is a schematic diagram of a portion or block 16 of the display panel 1. Electrostatic charge can be relieved by thin-film transistors (TFTs) in non-display area 14. Taking a long metal line 20 as an example, electrostatic charge is easily accumulated in the end of metal line 20 and then voltage potential decreases from the end to the middle portion of the metal line 20. As such, a dielectric breakdown event will occur in gates of TFTs 141~143 when electrostatic charge accumulated in the left end of metal line 20 reaches a threshold value. Therefore, electrostatic charge can be relieved by the dielectric breakdown event.

Since the dielectric breakdown event is non-recoverable, TFTs 141~143 are easily damaged by electrostatic charge. Electrostatic charge will easily damage TFTs in display area 12 as the accumulated electrostatic charge is larger than that TFTs 141~143 can relieve. Therefore, defects may easily occur in display area 12. Additionally, TFTs 141~143 are incrementally damaged more easily as the amount of electrostatic charge increases during manufacture.

SUMMARY

Display devices for displaying images are provided. An embodiment of such a display device comprises a display panel that comprises display pixels and non-display pixels. Each display pixel comprises at least one switching thin-film transistor. Each non-display pixel comprises a plurality of dummy thin-film transistors. The number of the dummy thin-film transistors of a first non-display pixel among the non-display pixels exceeds the number of the switching thin-film transistor of a first display pixel among the display pixels.

Another embodiment of a display device for displaying images comprises a display panel comprising a display pixel and a non-display pixel. The display pixel comprises at least one switching thin-film transistor and the non-display pixel comprises dummy thin-film transistors. A number of the dummy thin-film transistors exceeds a number of the switching thin-film transistors.

DESCRIPTION OF THE DRAWINGS

The invention can be more fully understood by reading the subsequent detailed description and examples with reference made to the accompanying drawings, wherein:

FIG. 4b is a schematic layout diagram of the embodiment of FIG. 4a;

FIG. 5b is a schematic layout diagram of the embodiment of FIG. 5a; and

DETAILED DESCRIPTION

Figure 3:
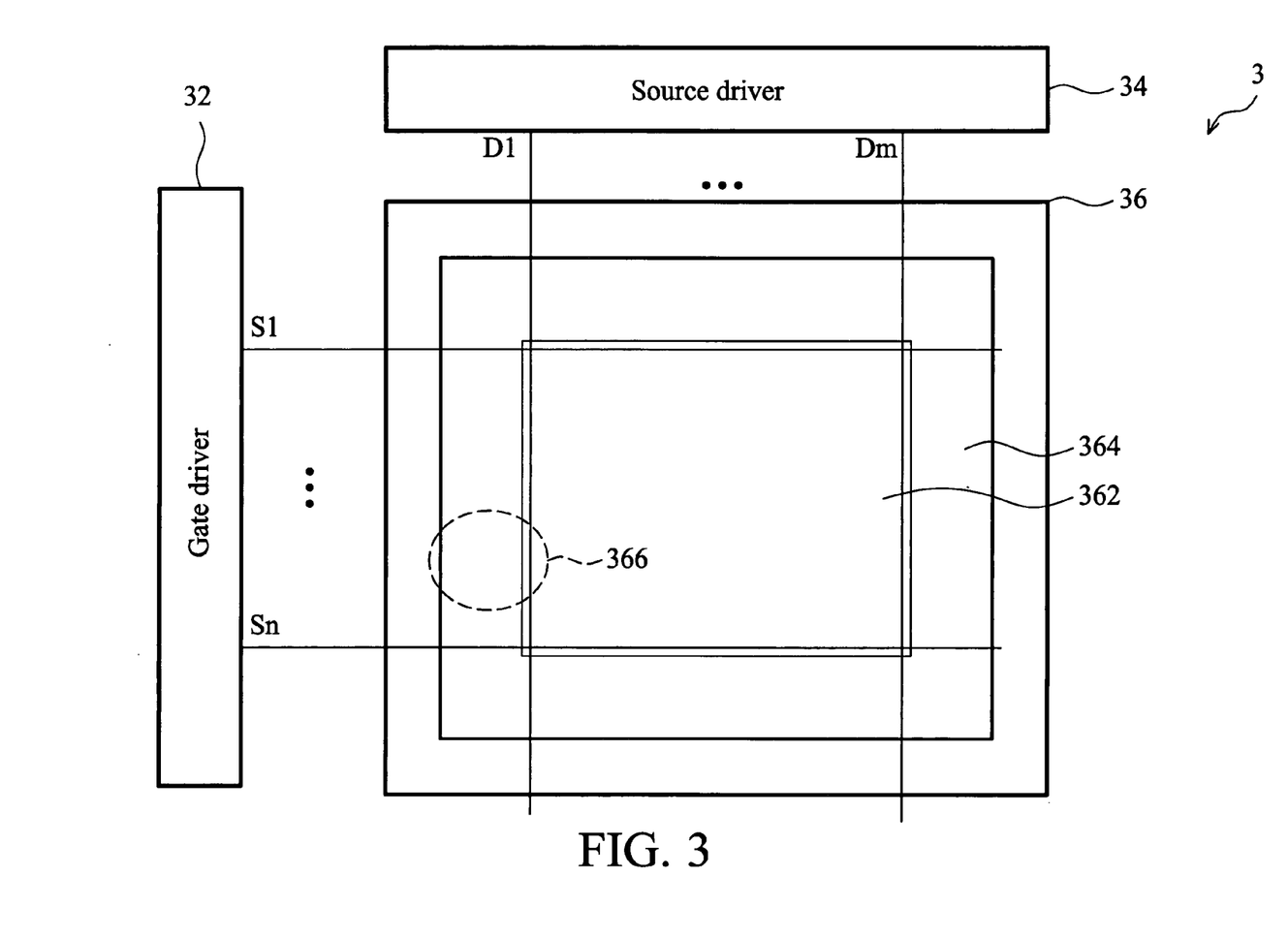
FIG. 3 is a schematic diagram of an exemplary embodiment of a display device for displaying images.

FIG. 3 is a schematic diagram of an exemplary embodiment of a display device for displaying images. In this embodiment, the display device is implemented as an electronic device 3. By way of example, electronic device 3 can be a cellular phone, PDA (personal digital assistant), laptop computer, notebook computer, tablet computer, car TV, or digital camera, etc. Electronic device 3 comprises a gate driver 32, a source driver 34, and a display panel 36. Gate driver 32 supplies scan signals S1~Sn to gate lines. Source driver 34 supplies data signals D1~Dm to source lines. Display panel 36 comprises a display area 362 and a non-display area 364. In some embodiments, a display panel combines a gate driver with a source driver.

Figure 4A:
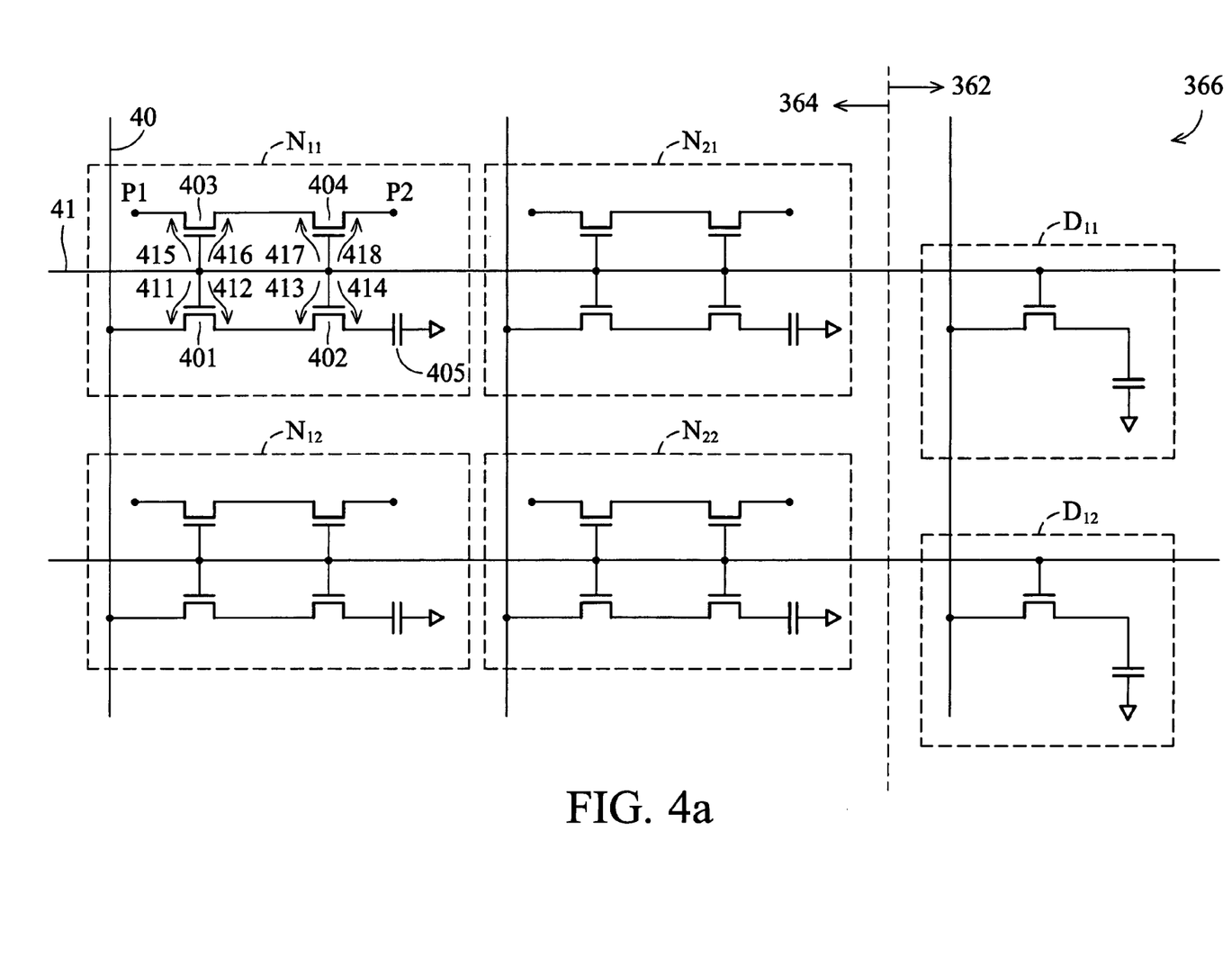
FIG. 4a is a schematic diagram of a portion of the display device of FIG. 3.

FIG. 4a is a schematic diagram of a portion (block 366) of the display device of FIG. 3. As shown in FIG. 4a, display area 362 comprises display pixels $D_{11}$~$D_{12}$. Each display pixel comprises at least one switching TFT. Non-display area 364 comprises non-display pixels $N_{11}$~$N_{22}$. Each non-display pixel comprises dummy TFTs. The number of the dummy TFTs of a first non-display pixel among the non-display pixels exceeds the number of the switching TFTs of a first display pixel among the display pixels. The number of the switching TFTs and that of the dummy TFTs are not limited. In this embodiment, each display pixel comprises one switching TFT and each non-display pixel comprises four dummy TFTs.

Display panel 36 can relieve electrostatic charge damage incrementally as the number of the dummy TFTs is increased. Although the number of the dummy TFTs exceeds the number of the switching TFTs, the area of one non-display pixel in non-display area 364 may be equal to the area of one display pixel in display area 362.

Since the structures of non-display pixels $N_{11}$~$N_{22}$ are the same, only non-display pixel $N_{11}$ is described here as an example. As shown in FIG. 4a, non-display pixel $N_{11}$ comprises dummy TFTs 401~404. Dummy TFT 401 is serially connected to dummy TFT 402 between source line 40 and capacitor 405. Dummy TFT 403 is serially connected to dummy TFT 404 between nodes P1 and P2. The states of nodes P1 and P2 are floating states.

When electrostatic charge is accumulated in a left end of a metal line 41 and reaches a preset value, a dielectric breakdown event occurs in the gates of dummy TFTs 401~404 such that electrostatic charge is relieved by paths 411~418. Thus, electrostatic charge in the left end of metal line 41 is reduced as electrostatic charge is relieved by non-display pixel $N_{11}$.

Since the number of the dummy TFTs of non-display pixel $N_{11}$ is increased, the majority of the electrostatic charge will be relieved by paths 411~418. Therefore, the breakdown event should not occur in the dummy TFTs of non-display pixel $N_{21}$ and display pixel $D_{11}$.

When the number of the dummy TFTs of the non-display pixels is increased, the dummy TFTs can relieve more electrostatic charge. Therefore, the capability of relieving ESD of the non-display pixels is increased.

In some embodiments, the channel width or length of one dummy TFT is less than that of one switching TFT for easily triggering the dielectric breakdown event in the dummy TFTs.

Figure 4B:
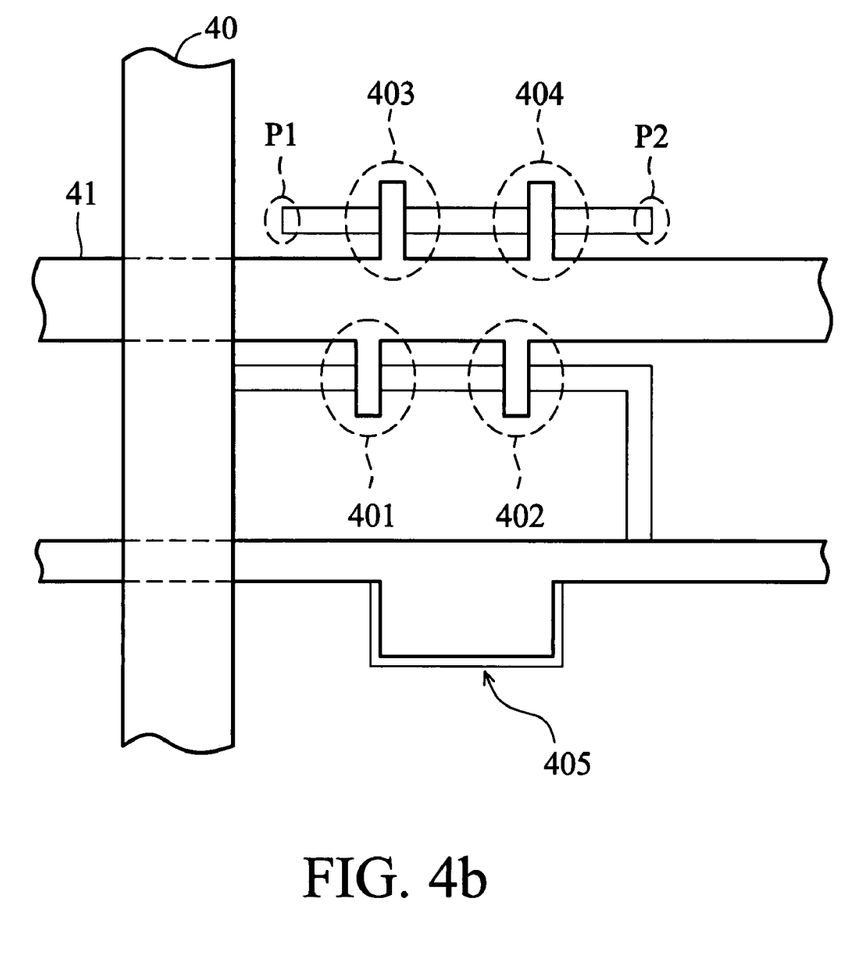

FIG. 4b is a schematic layout diagram of an exemplary embodiment of non-display pixel $N_{11}$. The gates of dummy TFTs 401~404 are coupled to metal line 41. Dummy TFT 401 is serially connected to dummy TFT 402 between source line 40 and capacitor 405. Dummy TFT 403 is serially connected to dummy TFT 404 between nodes P1 and P2. Dummy TFT 401 is parallel connected with dummy TFT 403. Dummy TFT 402 is parallel connected with dummy TFT 404. In some embodiments, dummy TFT 401 can be serially connected to dummy TFT 402 between floating nodes.

Figure 5A:
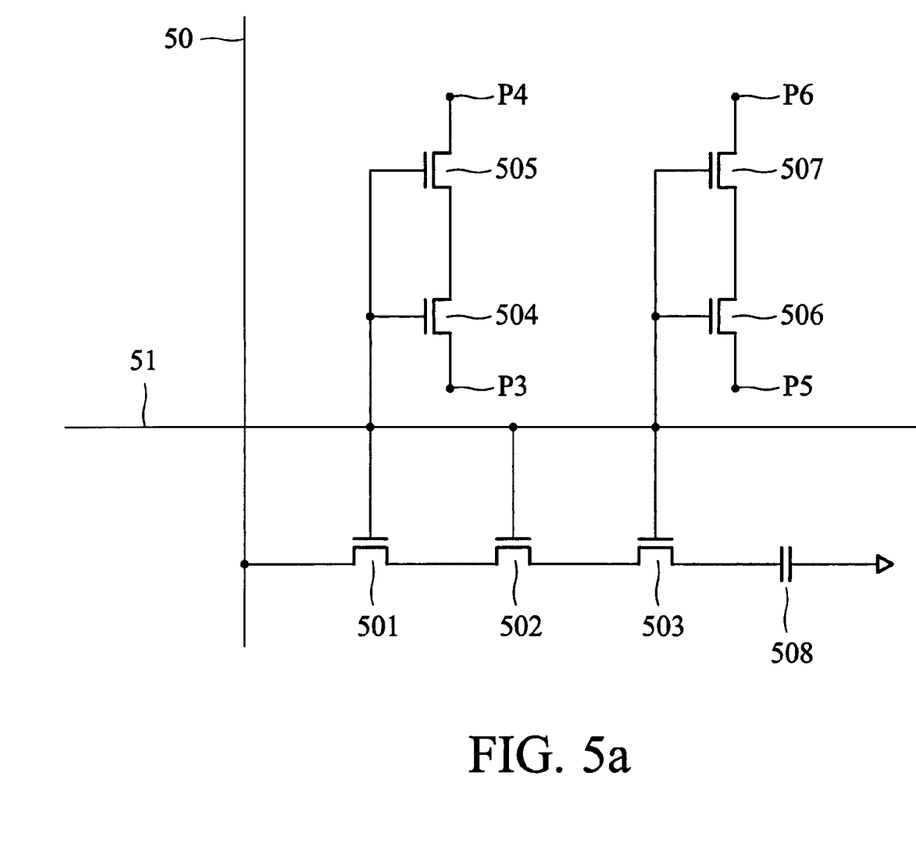
FIG. 5a is a schematic diagram of another exemplary embodiment of a non-display pixel.
Figure 5B:
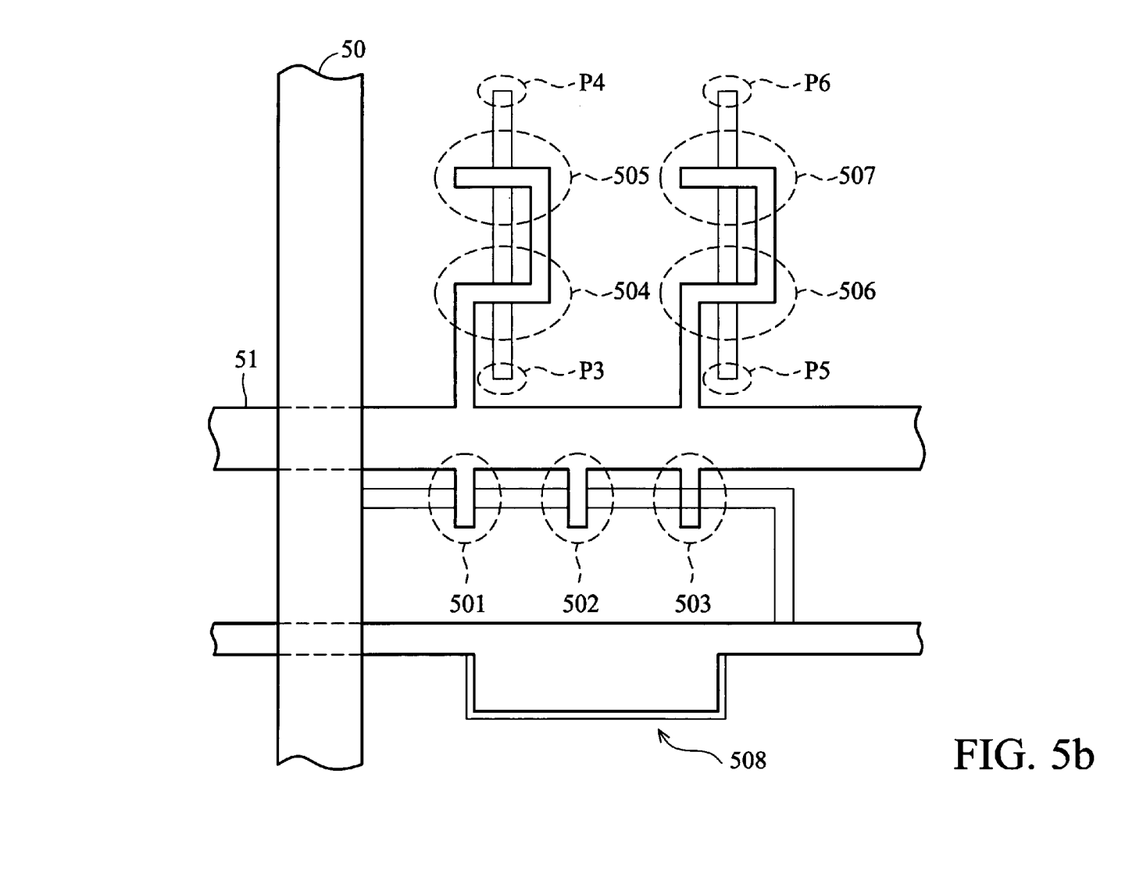

FIG. 5a is schematic diagram of another exemplary embodiment of the non-display pixel. FIG. 5b is a schematic layout diagram of the embodiment of FIG. 5a. As shown in FIGS. 5a and 5b, the gates of dummy TFTs 501~507 are coupled to gate line 51. Dummy TFT 501 is serially connected to dummy TFTs 502 and 503 between source line 50 and capacitor 508. Dummy TFT 504 is serially connected to dummy TFT 505 between nodes P3 and P4. Dummy TFT 506 is serially connected to dummy TFT 507 between nodes P5 and P6. The states of nodes P3~P6 are floating states. Since FIGS. 4a and 5a have the same principle, descriptions of FIG. 5a is omitted.

Figure 6:
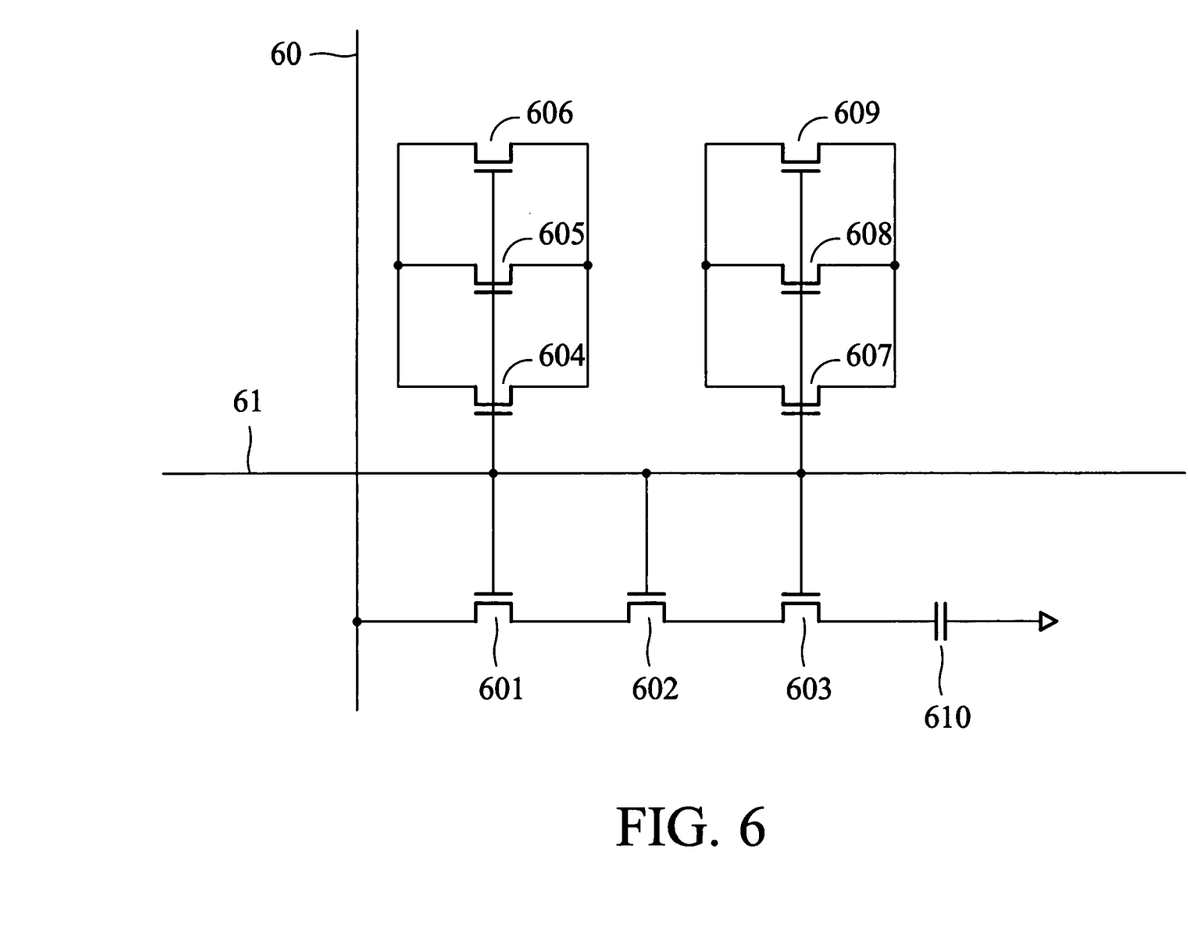
FIG. 6 is a schematic diagram of another exemplary embodiment of a non-display pixel.

FIG. 6 is a schematic diagram of another exemplary embodiment of a non-display pixel. As shown in FIG. 6, the gates of dummy TFTs 601~609 are coupled to gate line 61. Dummy TFT 601 is serially connected to dummy TFTs 602 and 603 between source line 60 and capacitor 610. Dummy TFT 604 is parallel connected with dummy TFTs 605 and 606. Dummy TFT 607 is parallel connected with dummy TFTs 608 and 609. Dummy TFT 601 is parallel connected with dummy TFT 604. Dummy TFT 603 is parallel connected with dummy TFT 607. Since FIGS. 4a and 6 have the same principle, descriptions of FIG. 6 is omitted.

By way of example, different layout methods can be used to provide a number of dummy TFTs of one non-display pixel that exceeds the number of switching TFTs of one display pixel.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display device for displaying images comprising:
    a display panel comprising:
        a plurality of display pixels, each comprising at least one switching thin-film transistor; and
        a plurality of non-display pixels, each comprising a plurality of dummy thin-film transistors, wherein a number of the dummy thin-film transistors of a first non-display pixel among the non-display pixels exceeds a number of the switching thin-film transistors of a first display pixel among the display pixels, the dummy thin-film transistors of the first non-display pixel are divided into a plurality of first dummy thin-film transistors and a plurality of second dummy thin-film transistors, and gates of the first and the second dummy thin-film transistors are coupled to each other, the first dummy thin-film transistors are connected to each other in series and the second dummy thin-film transistors are connected to each other in series.

2. The display device as claimed in claim 1, wherein the first dummy thin-film transistors are connected to each other in series and the second dummy thin-film transistors are connected to each other in parallel.

3. The display device as claimed in claim 1, wherein one of the first dummy thin-film transistors is connected with one of the second dummy thin-film transistors in parallel.

4. The display device as claimed in claim 1, wherein the first dummy thin-film transistors and a capacitor are connected in series.

5. The display device as claimed in claim 1, wherein a channel length of one of the first dummy thin-film transistors is less than that of one of the switching thin-film transistors.

6. The display device as claimed in claim 1, further comprising:
    a gate driver operative to supply a plurality of data signals to the display panel; and
    a source driver operative to supply a plurality of data signals to the display panel.

7. The display device as claimed in claim 1, further comprising:
    means for providing signals to the display panel.

8. A display device for displaying images comprising:
    a display panel comprising a display pixel and a non-display pixel, the display pixel comprising at least one switching thin-film transistor, the non-display pixel comprising dummy thin-film transistors, wherein a number of the dummy thin-film transistors exceeds a number of the switching thin-film transistors, and the dummy thin-film transistors are connected in series between two floating nodes.

9. The display device as claimed in claim 8, wherein the dummy thin-film transistors are divided into a first group of dummy thin-film transistors and a second group of dummy thin-film transistors and wherein the dummy thin-film transistors have gates, and the gates of the first group and the second group of dummy thin-film transistors are coupled.

10. The display device as claimed in claim 9, wherein dummy thin-film transistors of the first group are connected to each other in series and dummy thin-film transistors of the second group are connected to each other in parallel.

11. The display device as claimed in claim 8, wherein the display device comprises an electronic device, the electronic device comprising the display panel.

12. The display device as claimed in claim 11, wherein the electronic device is a laptop computer.

13. The display device as claimed in claim 11, further comprising: means for providing signals to the display panel.

* * * * *